United States Patent
Shen et al.

(10) Patent No.: US 12,462,085 B2
(45) Date of Patent: Nov. 4, 2025

(54) LAYOUT METHOD AND RELATED NON-TRANSITORY COMPUTER-READABLE MEDIUM

(71) Applicant: REALTEK SEMICONDUCTOR CORPORATION, Hsinchu (TW)

(72) Inventors: Tze-Min Shen, Hsinchu (TW); Ting-Ying Wu, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 573 days.

(21) Appl. No.: 18/049,486

(22) Filed: Oct. 25, 2022

(65) Prior Publication Data

US 2023/0205964 A1  Jun. 29, 2023

(30) Foreign Application Priority Data

Dec. 24, 2021 (TW) .................. 110148762

(51) Int. Cl.
*G06F 30/392* (2020.01)
*G06F 30/3308* (2020.01)
*G06F 30/367* (2020.01)
*G06F 30/398* (2020.01)

(52) U.S. Cl.
CPC ........ *G06F 30/392* (2020.01); *G06F 30/3308* (2020.01); *G06F 30/367* (2020.01); *G06F 30/398* (2020.01)

(58) Field of Classification Search
CPC .. G06F 30/392; G06F 30/3308; G06F 30/367; G06F 30/398
USPC ....... 716/119, 111, 122, 124, 106, 136, 137; 703/14
See application file for complete search history.

(56) References Cited

U.S. PATENT DOCUMENTS

| | | | | |
|---|---|---|---|---|
| 10,285,276 B1 * | 5/2019 | Kukal | .................. | H05K 3/0005 |
| 2020/0334408 A1 * | 10/2020 | Kobe | .................... | G06F 30/367 |
| 2023/0097030 A1 * | 3/2023 | Rittman | ................ | G06F 30/327 |
| | | | | 716/110 |

\* cited by examiner

*Primary Examiner* — Phallaka Kik
(74) *Attorney, Agent, or Firm* — WPAT, P.C.; Anthony King

(57) ABSTRACT

A layout method is configured to design a layout of a bridging circuit between source circuit and a destination circuit of a circuit system. The layout method includes: categorizing the bridging circuit into sub-regions according to physical structural characteristics; obtaining default sub-region model units corresponding to the sub-regions from a database; setting the default sub-region model units by the parameters to obtain sub-region models; extracting, using an electromagnetic simulation software, electrical models from the sub-region models, respectively; connecting the sub-region models to obtain, using a circuit simulation software an entire electrical model; evaluating whether the entire electrical model meets a specific requirement of the bridging circuit with respect to the circuit system; and when the entire electrical model meets the specific requirement, obtaining a layout rule according to the sub-region models.

20 Claims, 3 Drawing Sheets

LAYOUT METHOD AND RELATED NON-TRANSITORY COMPUTER-READABLE MEDIUM

CROSS-REFERENCE TO RELATED APPLICATIONS

This application claims the benefit of priority to Patent Application No. 110148762, filed in Taiwan on Dec. 24, 2021, which is incorporated by reference in its entirety.

TECHNICAL FIELD

The present application relates to a layout method and an associated non-transitory computer-readable medium, particularly to a layout method and an associated non-transitory computer-readable medium for obtaining a layout rule.

BACKGROUND

When manufacturing a circuit, there is considerable freedom in the design of the circuit layout. However, regardless of the layout design, the circuit must conform to the system specifications for the circuit. Therefore, when the designed circuit layout does not meet the specifications, the entire circuit layout must be redesigned. The high degree of freedom in the design of the layout results in a large number of design options, which in turn makes the process of designing the circuit layout extremely time-consuming, and therefore how to design the circuit layout more efficiently has become an important issue in this field.

SUMMARY OF THE INVENTION

An aspect of the present disclosure provides a layout method configured to design a layout of a bridging circuit between a source circuit and a destination circuit of a circuit system. The layout method includes the following steps: categorizing the bridging circuit into a plurality of sub-regions according to physical structural characteristics; obtaining a plurality of default sub-region model units corresponding the plurality of sub-regions from a database; setting the plurality of default block model units using a plurality of parameters to obtain a plurality of sub-region models; using an electromagnetic simulation software to extract a plurality of electrical models from the plurality of sub-region models, respectively; using a circuit simulation software to cascade the plurality of electrical models to obtain an overall electrical model; evaluating whether the overall electrical model meets a specification requirement for the bridging circuit required by the circuit system; and when the overall electrical model meets the specification requirement, obtaining a layout rule according to the plurality of sub-region models.

Another aspect of the present disclosure provides a non-transitory computer-readable medium configured to store a program code. When the program code is executed by a processor, it causes the processor to perform the following steps: categorizing the bridging circuit of a circuit system into a plurality of sub-regions according to physical structural characteristics; obtaining a plurality of default sub-region model units corresponding the plurality of sub-regions from a database; setting the plurality of default block model units using a plurality of parameters to obtain a plurality of sub-region models; using an electromagnetic simulation software to extract a plurality of electrical models from the plurality of sub-region models, respectively; cascading the plurality of electrical models to obtain an overall electrical model; evaluating whether the overall electrical model meets a specification requirement for the bridging circuit required by the circuit system using a circuit simulation software; and when the overall electrical model meets the specification requirement, obtaining a layout rule according to the plurality of sub-region models.

Compared with the prior art, the layout method of the present disclosure and the associated non-transitory computer-readable medium are used to obtain the layout rules of the circuit layout, so that the circuit manufacturing is more efficient.

BRIEF DESCRIPTION OF THE DRAWINGS

Various aspects of the present application can best be understood upon reading the detailed description below and accompanying drawings. It should be noted that the various features in the drawings are not drawn to scale in accordance with standard practice in the art. In fact, the size of some features may be deliberately enlarged or reduced for the purpose of discussion.

DETAILED DESCRIPTION

Figure 1:
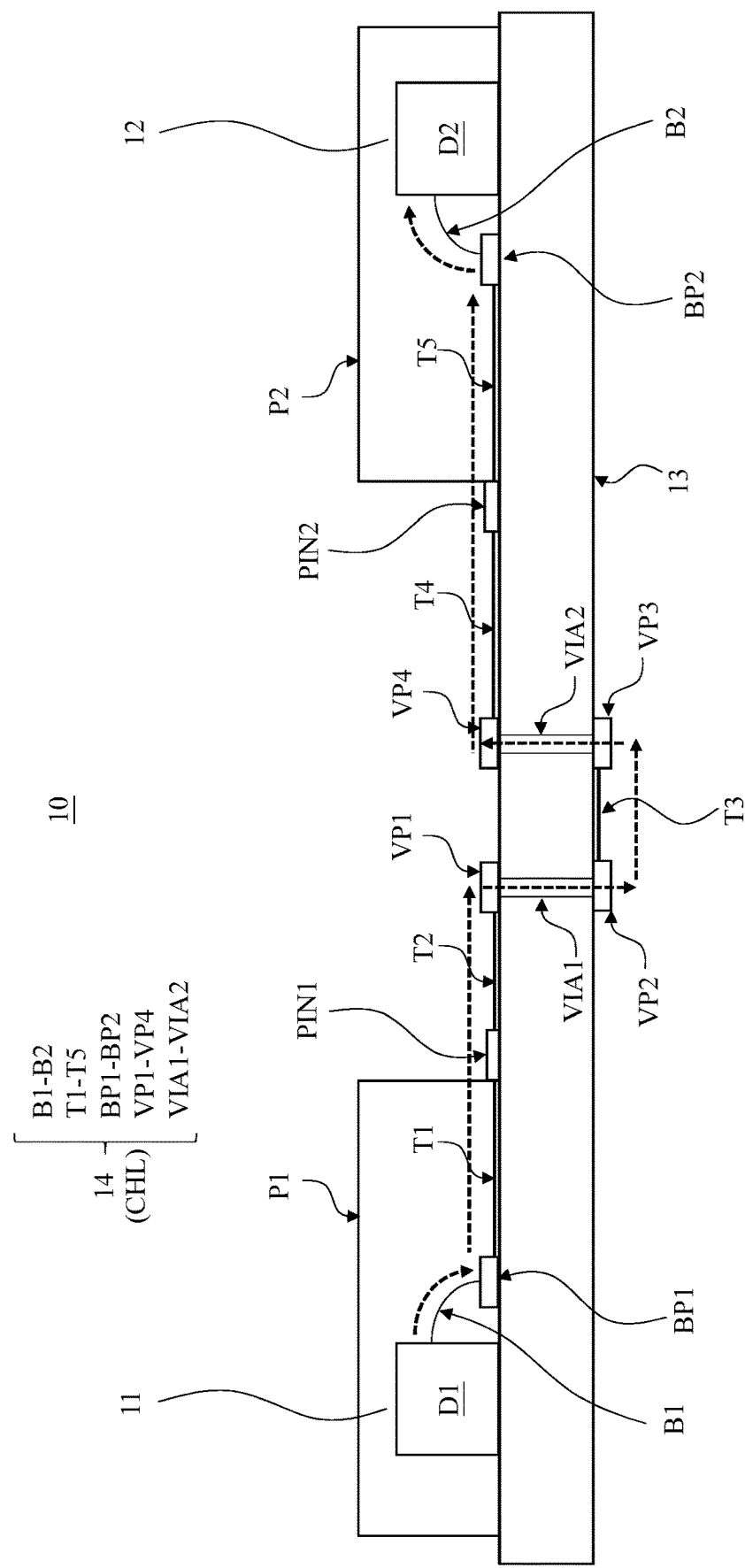
FIG. 1 is a schematic diagram illustrating a circuit system according to some embodiments of the present disclosure.

FIG. 1 is a schematic diagram illustrating a circuit system 10 according to some embodiments of the present disclosure. The circuit system 10 includes a source circuit 11, a destination circuit 12, a printed circuit board 13 and a bridging circuit 14 connecting the source circuit 11 and the destination circuit 12.

The source circuit 11 is disposed on a die D1, wherein the die D1 is packaged by a package structure P1, and the die D1 is connected a pin PIN1 of the package structure P1 through the bond-wire B1, the bond-wire pad BP1 and trace T1 within the package structure P1.

The package structure P1 is connected to a pin PIN2 of the package structure P2 through the pin PIN1, the trace T2 on the printed circuit board 13, the via pad VP1, via VIA1, the via pad VP2, the trace T3 on the printed circuit board 13, the via pad VP3, the via VIA2, the via pad VP4 and the trace T4 on the printed circuit board 13.

The pin PIN2 is connected to the destination circuit 12 disposed on the die D2 through the trace T5 within the package structure P2, the bond-wire pad BP2 and the bond-wire B2.

The bridging circuit 14 includes a channel CHL connecting the source circuit 11 and the destination circuit 12. In FIG. 1, the channel CHL is connected by multiple dashed arrows, that is, the structure of the bridging circuit 14 includes bond-wires B1-B2, bond-wire pads BP1-BP2, pins PIN1-PIN2, vias VIA1-VIA2, via pads VP1-VP4 and traces T1-T5. In some embodiments, the structure of the bridging circuit 14 only includes some components of the bond-wires B1-B2, bond-wire pads BP1-BP2, pins PIN1-PIN2, vias VIA1-VIA2, via pads VP1-VP4, and traces T1-T5; for example, the bridging circuit 14 may not include the bond-wire pads BP1 to BP2.

In some embodiments, the circuit system 10 has predetermined performance requirements for the transmission signal transmitted from the source circuit 11 to the destination circuit 12, and the transmission signal is transmitted through the channel CHL of the bridging circuit 14, so that the circuit system 10 has a specification requirement for the bridging circuit 14. When the bridging circuit 14 meets the specification requirement, it can be determined that the transmission signal transmitted from the source circuit 11 to the destination circuit 12 can meet the specification of the circuit system 10.

Generally, the circuit system 10 has a known specification requirement for the bridging circuit 14, and how to make the bridging circuit 14 to meet the specification requirement has relatively great flexibility. More specifically, when making the bridging circuit 14, the layout of the bridging circuit 14 is first designed, and the layout must essentially comply with a layout rule, so that the bridging circuit 14 manufactured with the layout can meet the specification requirement. However, the layout rule of the bridging circuit 14 is unknown. Therefore, in conventional art, the bridging circuit 14 is made by manual and lengthy layout design, whereas the thus-obtained layout has to be tested for electrical characteristics. When the electrical characteristics of the designed layout do not meet the specification requirement, the layout of bridging circuit 14 must be redesigned. After the electrical characteristics of the designed layout meet the specification requirement, the bridging circuit 14 is manufactured according to the final layout that meets the specification requirement. In short, because the layout rules of the bridging circuit 14 are unknown, the manufacturing of the bridging circuit 14 is a relatively time-consuming operation in the conventional art.

Compared with the conventional art, the present disclosure provides a layout method 20 for designing the bridging circuit 14. The layout method 20 is used to obtain the layout rule of the bridging circuit 14 and generate the layout of the bridging circuit 14 according to the layout rule, and then the bridging circuit 14 is manufactured according to the thus-generated layout.

Figure 2:
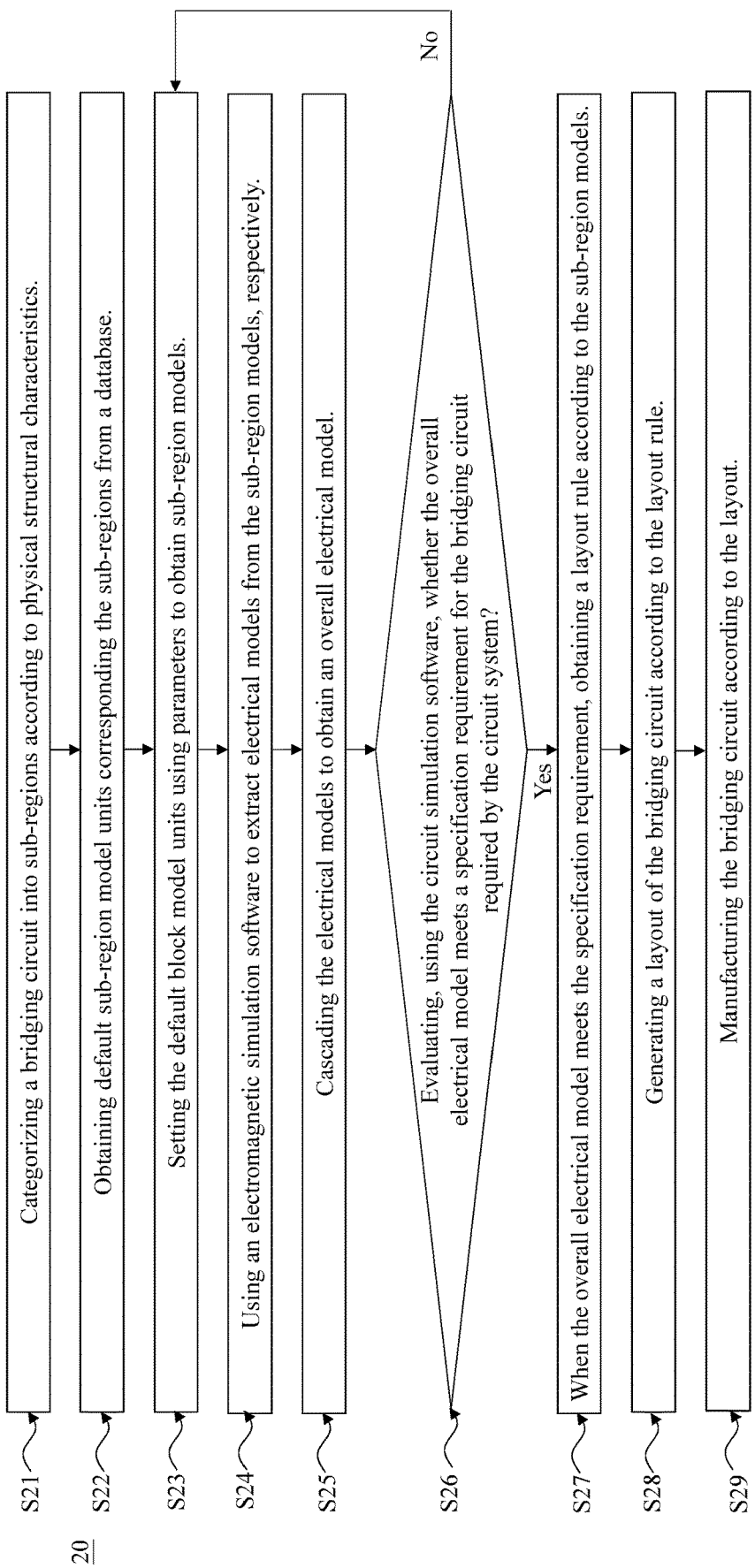
FIG. 2 is flowchart illustrating a layout method according to some embodiments of the present disclosure.

Reference is made to FIG. 2. FIG. 2 is a flowchart illustrating the layout method 20 according to some embodiments of the present disclosure. The layout method 20 includes the Steps S21, S22, S23, S24, S25, S26, S27, S28 and S29. For the ease of understanding, the layout method 20 is explained by referencing to FIG. 1 and the reference numerals of FIG. 1.

In the Step S21, the bridging circuit 14 is categorized into a plurality of sub-regions according to physical structural characteristics of the circuit components. In some embodiments, the plurality of sub-regions includes a bond-wire sub-region, a trace sub-region and a via sub-region, wherein the bond-wire sub-region, the trace sub-region and the via sub-region respectively correspond to the bond-wires B1-B2, the traces T1-T5 and vias VIA1-VIA2 of the bridging circuit 14 of FIG. 1. However, the present disclosure is not limited thereto; the bridging circuit 14 may be categorized into more or less sub-regions according to the physical structural characteristics of the circuit components.

In some embodiments, when creating the circuit layout, one can obtain corresponding default model blocks from a database according to the circuit components. For example of a circuit including a trace, a resistor and a capacitor, when creating the layout of the circuit, one may select the default model blocks for traces, resistors and capacitors from the database. Then, the default model blocks for traces, resistors and capacitors are connected to form an overall circuit layout according to the connections of the circuit. In other words, the database is configured to store a plurality of default model blocks, whereas the plurality of default model blocks respectively correspond to a plurality of sub-regions in the circuit that are categorized according to physical structural characteristics.

In the Step S22, a plurality of default block model units corresponding the plurality of sub-regions are obtained from the database. For example, the sub-regions includes the bond-wire sub-region, the trace sub-region and the via sub-region, and in the Step S22, a bond-wire default block model unit, a trace default block model unit and a via default block model unit are obtained from the plurality of default block model units.

The plurality of default block model units are parametric block model units that retain design flexibility and maintain design simplicity. For example, when the bridging circuit 14 includes traces with two different trace widths, the designer can use the same trace default block model unit and set the trace default block model unit according to the different trace widths to obtain two trace block models with different parameters.

In the Step S23, the plurality of default block model units are setting using a plurality of parameters to obtain a plurality of sub-region models. In some embodiments, the plurality of parameters include a bond-wire arc height, a trace length, a trace width, a trace spacing, a ground shield, a pad size, a substrate thickness and a substrate material. In some embodiments, the bond-wire default block model unit has an adjustable bond-wire arc height, the trace default block model unit has an adjustable trace length, trace width, trace spacing and ground shield, and the via default block model unit has an adjustable pad size and substrate thickness. In the Step S23, the bond-wire default block model unit is set using the bond-wire arc height to obtain the bond-wire sub-region model, the trace default block model unit is set using the trace length, the trace width, the trace spacing and the ground shield to obtain the trace sub-region model, and the via default block model unit is set using the pad size and the substrate thickness to obtain the via sub-region model.

In the Step S24, a plurality of electrical models are extracted from the plurality of sub-region models, respectively, using an electromagnetic simulation software. In some embodiments, the electromagnetic simulation software is a three-dimensional (3D) full-wave electromagnetic simulation software, such as ANSYS HFSS simulation software provided by ANSYS, Inc. The electromagnetic simulation software is configured to set an input node, an output node and an excitation source for each of the plurality of sub-region models; hence, the electromagnetic simulation software may extract the electrical model for each sub-region model independently. In some embodiments, the electrical model includes information about S-parameters and/or RLGC. In some further embodiment, the electromagnetic simulation software is used to build the default model blocks in the database in advance.

Generally, the electrical characteristics of a circuit are derived from fixed sub-regions using simple mathematical formulas. When the structure of a circuit is more complex, such as a structure that contains multiple signal interactions (e.g., bond-wires, vias, etc.) or a structure with an incomplete return path (e.g., traces of a multi-layer circuit board), using only fixed sub-regions for calculations can lead to inaccurate results. Since these fixed sub-regions are predefined only for fixed structures, there is less flexibility in their application. In contrast to the above method, the present disclosure uses 3D full-wave electromagnetic simulation software to create default sub-blocks according to actual requirements and extracts the electrical model of the circuit according to these default sub-regions. The 3D full-wave electromagnetic simulation software parametrizes the default sub-blocks, so it is more flexible for different structures and more adaptable to different situations, and the extracted electrical model is more accurate.

In the Step S25, the plurality of electrical models are connected to form an overall electrical model. The overall electrical model corresponds to the bridging circuit 14. Specifically, the overall electrical model is the electrical model of the channel CHL. In some embodiments, the bridging circuit 14 may have a plurality of the channels CHL, whereas the overall electrical model obtained in the Step S25 corresponds to the critical path of the plurality of the channel CHL; that is, the overall electrical model represents the longest channel in the bridging circuit 14 or the electrical model of the channel causing the greatest delay.

Since the plurality of sub-region models respectively correspond to a portion of the channel CHL, when the electromagnetic simulation software extracts the electrical models of the plurality of sub-region models, it only needs to consider the limitation to the sub-regions, and hence, the computation or simulation required is less, thereby consuming less time, as compared to extracting electrical models for the entire channel model. In other words, the efficiency for obtaining the overall electrical model is higher, which in turn improves the efficiency for layout design.

In the Step S26, a circuit simulation software is used to evaluate whether the overall electrical model meets the specification requirement of the bridging circuit 14 required by the circuit system 10. In some embodiments, the circuit simulation software is used to obtained the electrical characteristics of the overall electrical model, and then the electrical characteristics is compared to the specification requirement of the bridging circuit 14 required by the circuit system 10. In some embodiments, the circuit simulation software is an EDA design tool, such as HSPICE or SPECTRE software. In some embodiments, the electrical characteristics of the overall electrical model may be presented using an eye diagram. In some other embodiments, the electrical characteristics of the overall electrical model may be presented by digital data or other graphical data, and the present disclosure is not limited thereto.

In some other embodiments, in order to obtain the effect of inter-channel coupling, the overall electrical model is replicated as a plurality of parallel electrical models in the Step S25, and electrical characteristics of the plurality of parallel overall electrical models are obtained in the Step S26.

When the overall electrical model meets the specification requirement of the bridging circuit 14 required by the circuit system 10, the layout method 20 proceeds to the Step S27. When the overall electrical model does not meet the specification requirement of the bridging circuit 14 required by the circuit system 10, the layout method 20 returns to the Step S23, and re-adjusting at least one of the plurality of parameters to set the plurality of default block model units to obtain a plurality of adjusted sub-region models is performed. For example, one may only adjust the trace width to set the trace sub-region model, while the other parameters are remained unchanged. However, the present disclosure is not limited thereto, and adjusting all sorts of combinations of the plurality of parameters fall within the contemplated scope of the present disclosure. After the layout method 20 returns to the Step S23, the Step S23 to the Step S26 are performed again until the overall electrical model meets the specification requirement of the bridging circuit 14 required by the circuit system 10, and then the layout method 20 further proceeds to the step S27.

In the Step S27, the layout rule is obtained according to the plurality of sub-region models. Specifically, the layout rule is obtained according to the parameters configured to set the default block model unit in the Step S23. For example, when a trace spacing of X unit is used to set trace default block model unit in the Step S23, then a layout rule thus-obtained must have a trace spacing of at least X units, where X is for illustrative purposes only, and the units may be of any length, without limitation. In an alternative example, if trace default block model unit is set to have at least one ground shield in Y signal lines, then the layout rule thus-obtained must have at least one ground shield in Y signal lines.

In the Step S28, the layout of the bridging circuit 14 is generated according to the layout rule. After obtaining the layout, in the Step S29, the bridging circuit 14 is manufactured according to the layout.

Figure 3:
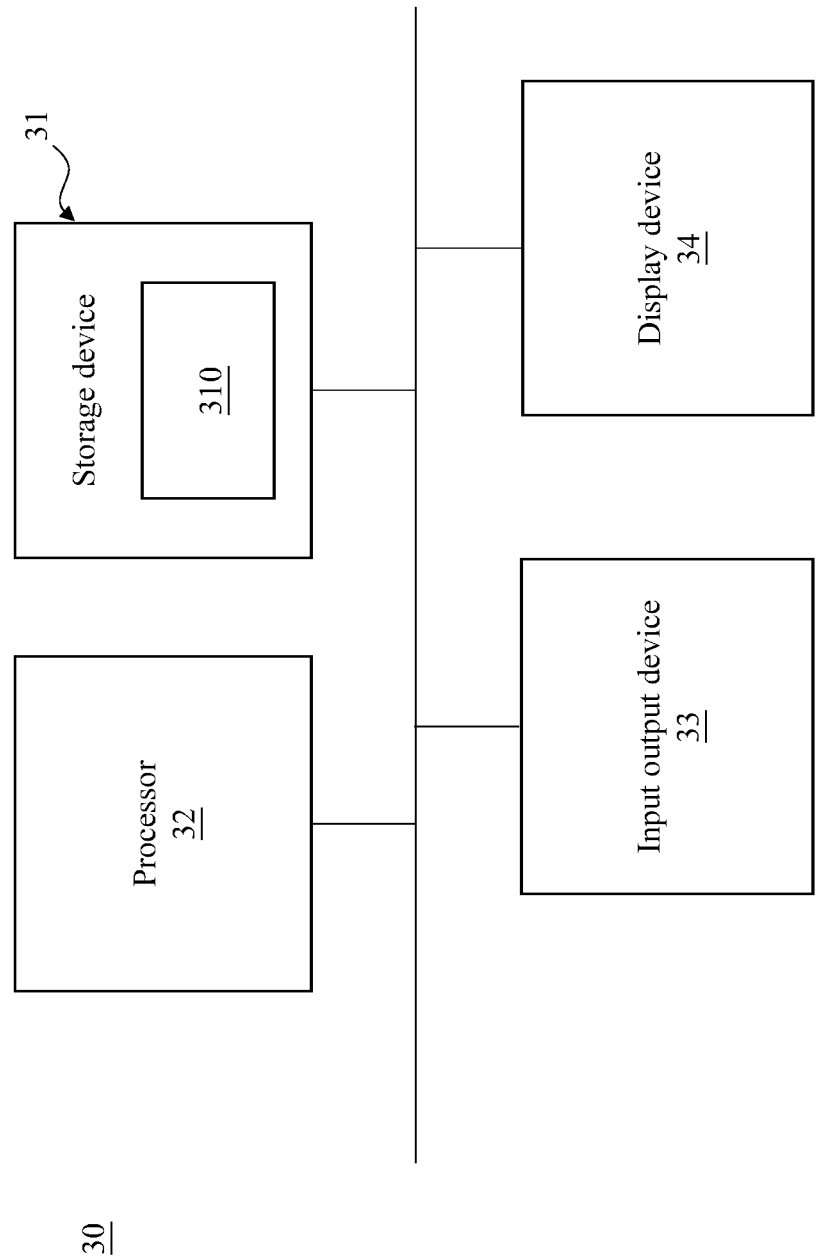
FIG. 3 is a schematic diagram illustrating a computer system according to some other embodiments of the present disclosure.

Reference is made to FIG. 3. FIG. 3 is a schematic diagram illustrating a computer system 30 according to some embodiments of the present disclosure. The computer system 30 includes a storage device 31, a processor 32, an input output device 33 and a display device 34. The storage device 31 is configured to store a program code, which is provided to the processor 32 for executing the program code. The input output device 33 is configured to receive information external to the computer system 30 and/or output information. The display device 34 is configured to display the process and/or result of the processor 32 executing the program code.

In some embodiments, the storage device 31 includes a non-transitory computer-readable medium 310. The non-transitory computer-readable medium 310 is configured to store the program code, and configured to provide the program code to the processor 32 for performing the layout method 20 of FIG. 2.

The foregoing description briefly sets forth the features of some embodiments of the present application so that persons having ordinary skill in the art more fully understand the various aspects of the disclosure of the present application. It will be apparent to those having ordinary skill in the art that they can easily use the disclosure of the present application as a basis for designing or modifying other processes and structures to achieve the same purposes and/or benefits as the embodiments herein. It should be understood by those having ordinary skill in the art that these equivalent implementations still fall within the spirit and scope of the disclosure of the present application and that they may be subject to various variations, substitutions, and alterations without departing from the spirit and scope of the present disclosure.

What is claimed is:

1. A layout method, configured to design a layout of a bridging circuit between a source circuit and a destination circuit of a circuit system, comprising:

categorizing the bridging circuit into a plurality of sub-regions according to physical structural characteristics;

obtaining a plurality of default sub-region model units corresponding the plurality of sub-regions from a database;

setting the plurality of default block model units using a plurality of parameters to obtain a plurality of sub-region models;

using an electromagnetic simulation software to extract a plurality of electrical models from the plurality of sub-region models, respectively;

using a circuit simulation software to cascade the plurality of electrical models to obtain an overall electrical model;

evaluating whether the overall electrical model meets a specification requirement for the bridging circuit required by the circuit system; and when the overall electrical model meets the specification requirement, obtaining a layout rule according to the plurality of sub-region models.

2. The layout method of claim 1, wherein the source circuit is disposed on a first die and is packaged by a first package structure, the destination circuit is disposed on a second die and is packaged by a second package structure, and the first package structure and a second package structure are disposed on a printed circuit board, wherein the bridging circuit comprises a channel from the source circuit to the destination circuit, wherein the channel passes from the first die sequentially through the first package structure, the printed circuit board and the second package structure to the second die.

3. The layout method of claim 1, wherein the plurality of sub-regions comprises a bond-wire sub-region, a trace sub-region and a via sub-region, and the plurality of default block model units comprises a bond-wire default block model unit, a trace default block model unit and a via default block model unit.

4. The layout method of claim 3, wherein the step of setting the plurality of default block model units using the plurality of parameters to obtain the plurality of sub-region models further comprises:

setting the bond-wire default block model unit using a bond-wire arc height of the plurality of parameters to obtain a bond-wire sub-region model.

5. The layout method of claim 3, wherein the step of setting the plurality of default block model units using the plurality of parameters to obtain the plurality of sub-region models further comprises:

setting the trace default block model unit using a trace length, a trace width, a trace spacing and a ground shield of the plurality of parameters to obtain a trace sub-region model.

6. The layout method of claim 3, wherein the step of setting the plurality of default block model units using the plurality of parameters to obtain the plurality of sub-region models further comprises:

setting the via default block model unit using a pad size and a substrate thickness of the plurality of parameters to obtain a via sub-region model.

7. The layout method of claim 1, wherein the electromagnetic simulation software is a three-dimensional full-wave electromagnetic simulation software.

8. The layout method of claim 1, further comprising:
generating a layout of the bridging circuit according to the layout rule; and
manufacturing the bridging circuit according to the layout.

9. The layout method of claim 1, wherein the step of evaluating whether the overall electrical model meets the specification requirement for the bridging circuit required by the circuit system further comprises:

obtaining an eye diagram using the overall electrical model to determine whether an electrical characteristic of the overall electrical model meets the specification requirement.

10. The layout method of claim 1, further comprising:
when the overall electrical model does not meet the specification requirement, adjusting the plurality of parameters, and setting the plurality of default block model units using the adjusted plurality of parameters to obtain the plurality of sub-region models.

11. A non-transitory computer-readable medium, storing a program code, which, when executed by a processor, causes the processor to perform the following steps:

categorizing the bridging circuit of a circuit system into a plurality of sub-regions according to physical structural characteristics;

obtaining a plurality of default sub-region model units corresponding the plurality of sub-regions from a database;

setting the plurality of default block model units using a plurality of parameters to obtain a plurality of sub-region models;

using an electromagnetic simulation software to extract a plurality of electrical models from the plurality of sub-region models, respectively;

cascading the plurality of electrical models to obtain an overall electrical model;

evaluating whether the overall electrical model meets a specification requirement for the bridging circuit required by the circuit system using a circuit simulation software; and when the overall electrical model meets the specification requirement, obtaining a layout rule according to the plurality of sub-region models.

12. The non-transitory computer-readable medium of claim 11, wherein the bridging circuit is disposed between a source circuit and a destination circuit of the circuit system.

13. The non-transitory computer-readable medium of claim 12, wherein the source circuit is disposed on a first die and is packaged by a first package structure, the destination circuit is disposed on a second die and is packaged by a second package structure, and the first package structure and a second package structure are disposed on a printed circuit board, wherein the bridging circuit comprises a channel from the source circuit to the destination circuit, wherein the channel passes from the first die sequentially through the first package structure, the printed circuit board and the second package structure to the second die.

14. The non-transitory computer-readable medium of claim 11, wherein the plurality of sub-regions comprises a bond-wire sub-region, a trace sub-region and a via sub-region, and the plurality of default block model units comprises a bond-wire default block model unit, a trace default block model unit and a via default block model unit.

15. The non-transitory computer-readable medium of claim 14, wherein in the step of setting the plurality of default block model units using the plurality of parameters to obtain the plurality of sub-region models, the processor further performs the following step:

setting the bond-wire default block model unit using a bond-wire arc height of the plurality of parameters to obtain a bond-wire sub-region model.

16. The non-transitory computer-readable medium of claim 14, wherein in the step of setting the plurality of default block model units using the plurality of parameters to obtain the plurality of sub-region models, the processor further performs the following step:

setting the trace default block model unit using a trace length, a trace width, a trace spacing and a ground shield of the plurality of parameters to obtain a trace sub-region model.

17. The non-transitory computer-readable medium of claim 14, wherein in the step of setting the plurality of default block model units using the plurality of parameters to obtain the plurality of sub-region models, the processor further performs the following step:

setting the via default block model unit using a pad size and a substrate thickness of the plurality of parameters to obtain a via sub-region model.

18. The non-transitory computer-readable medium of claim 11, wherein the electromagnetic simulation software is a three-dimensional full-wave electromagnetic simulation software.

19. The non-transitory computer-readable medium of claim 11, wherein in the step of evaluating whether the overall electrical model meets the specification requirement for the bridging circuit required by the circuit system, the processor further performs the following step:

obtaining an eye diagram using the overall electrical model to determine whether an electrical characteristics of the overall electrical model meets the specification requirement.

20. The non-transitory computer-readable medium of claim 11, wherein the program code, when executed by the processor, causes the processor to further perform the following the step:

when the overall electrical model does not meet the specification requirement, adjusting the plurality of parameters, and setting the plurality of default block model units using the adjusted plurality of parameters to obtain the plurality of sub-region models.

* * * * *